Feb. 26, 1952 E. J. COLE 2,586,786
HOLDING NUT WITH OFFSET THREADED END PORTIONS
Filed June 9, 1950 2 SHEETS—SHEET 1

INVENTOR.
EDWARD J. COLE
BY
Clark & Ott
ATTORNEYS

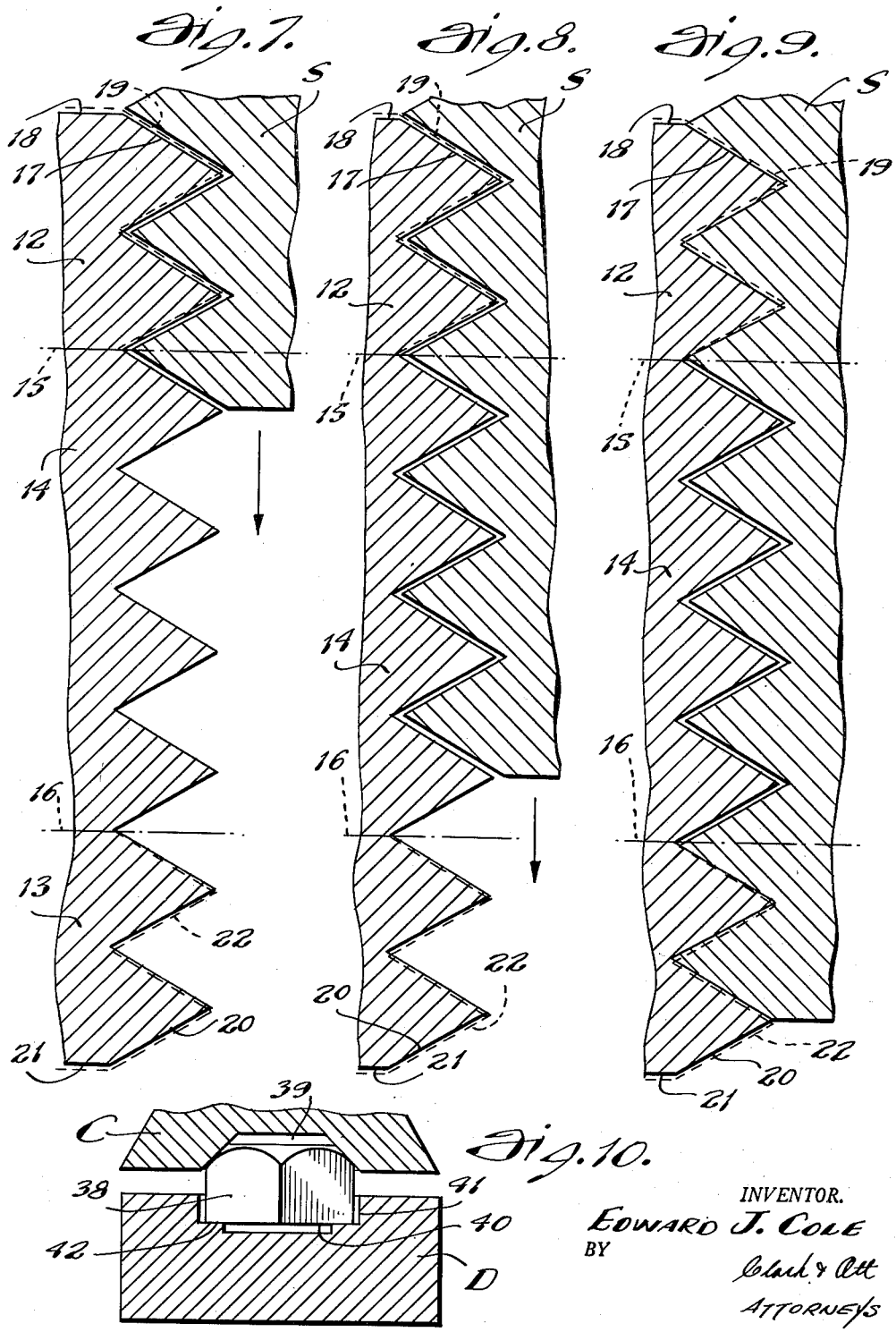

Patented Feb. 26, 1952

2,586,786

UNITED STATES PATENT OFFICE 2,586,786

HOLDING NUT WITH OFFSET THREADED END PORTIONS

Edward J. Cole, Peekskill, N. Y.

Application June 9, 1950, Serial No. 167,120

2 Claims. (Cl. 151—21)

This invention relates to a holding nut in which portions of the threaded bore at the opposite ends thereof are offset with reference to the intermediate portions so that the nut will tighten on a standard thread when the outer portions of the threaded bore are engaged by the stud.

Another object of the invention is to provide a holding nut having opposite crown faces through which the threaded bore opens and with the threaded bore adjacent the crown faces offset inwardly so as to provide a snug fitting nut when threadedly engaged by a stud from either crown face.

Another object of the invention is to provide a holding nut of said character in which the portions of the threaded bore have been offset axially inward with reference to the central portion thereof so as to vary the pitch distance between certain of the convolutions of the threaded bore whereby the tolerance at the opposite ends of the threaded bore is lessened.

In standard nuts the standard thread provides substantially the same gripping action between the thread thereof and the thread of a standard stud throughout the entire length of the nut and the nut is usually applied to the stud by threadedly engaging the same thereon from the face opposite the crown face thereof. The present invention contemplates the provision of a holding nut which is provided with opposite crown faces and a standard thread in which portions of the threaded bore adjacent the opposite crown faces have been offset in such a manner that a stud can be inserted from either crown face without changing the gripping condition between the nut and the stud until the stud has penetrated approximately three-quarters of the depth of the threaded bore when further turning of the nut on the stud increases the holding action thereof.

With the foregoing and other objects in view, reference is now made to the following specification and accompanying drawings in which the preferred embodiment of the invention is illustrated.

In the drawings:

Fig. 7 is an enlarged fragmentary vertical sectional view similar to Fig. 6 showing the stud in engagement with the offset threaded bore portion at one end of the nut.

Fig. 8 is a similar view showing the stud in engagement with the said offset threaded bore portion and with the intermediate threaded bore portion of the nut.

Fig. 9 is a similar view showing the stud engaging completely through the threaded bore of the nut.

Fig. 10 is a vertical sectional view of mating die members for offsetting the portions of the threaded bore at the opposite ends of a nut having a crown face and a flat face.

Figure 1:
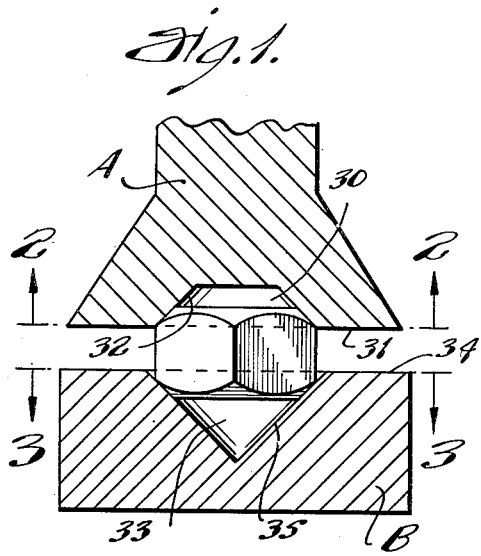
Fig. 1 is a vertical sectional view of mating die members for offsetting the portions of the threaded bore adjacent the opposite faces of the nut in accordance with the invention.

Referring to the drawings by characters of reference, the holding nut as illustrated is of standard hexagonal formation and is formed with a bore 10 provided with a V-type thread 11. The nut may however, be of any preferred formation and the bore may be provided with any preferred type of thread.

The nut is compressed or compacted to provide inwardly offset threaded portions 12 and 13 located at the opposite ends thereof and on opposite sides of a central threaded portion 14. In Figs. 7 to 9 inclusive, the extent of the offset threaded portions 12 and 13 are shown by the broken lines 15 and 16 respectively. The convolutions of the thread shown by the solid line 17 between the crown face 18 and the broken line 15 represents the formation of the threaded portion after compression or compaction, while the broken line 19 between the crown face 18 and the broken line 15 represents the formation of the convolutions before compression or compaction. Similarly at the other end of the nut the solid line 20 between the crown face 21 and the broken line 16 represents the formation of the convolutions of the thread after compression or compaction, while the broken line 22 between the crown face 21 and the broken line 16 represents the formation of the convolutions of the thread before compression or compaction. There is thus provided a nut in which the pitch distance between the convolutions of the thread in the threaded portions 12 and 13 has been lessened, while the pitch distance between the convolutions of the thread in the central portion, between the broken lines 15 and 16, remain unchanged. This lessens the tolerance of the nut at the opposite ends thereof.

As illustrated in Figs. 7 and 8 of the drawings, the threaded portion 12 and the central threaded portion 14 of the nut is adapted to freely receive a stud fragmentarily illustrated and represented by the reference character S. When however, the nut is turned on the stud until the threaded portion 13 is engaged thereby, as illustrated in Fig. 9, the shortened pitch of the thread at the opposite ends of the nut tightens the nut on the stud to thereby firmly hold the nut on the stud.

Figure 5:
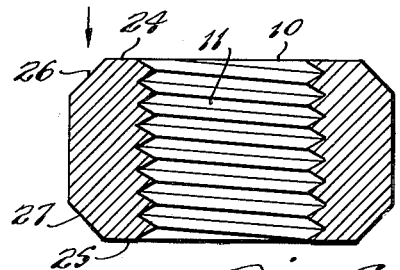
Fig. 5 is an enlarged vertical sectional view taken approximately on line 5—5 of Fig. 4 before the nut is acted upon by the die members.

In producing the nut having the characteristics hereinbefore described, the nut may be provided with the opposite crown faces 18 and 21 as illustrated in Fig. 5 of the drawings in which the threaded bore opens through the parallel end faces 24 and 25 thereof and the said faces are surrounded by chamfered peripheral edge portions 26 and 27 which are located at an angle of 145° to the end walls 24 and 25 respectively. Cooperating die members A and B are utilized to compress or compact the nut which are adapted to be installed in any preferred type of die press or the like for relative movement of the die members A and B towards each other for compressing or compacting the nut located therebetween.

Figure 2:
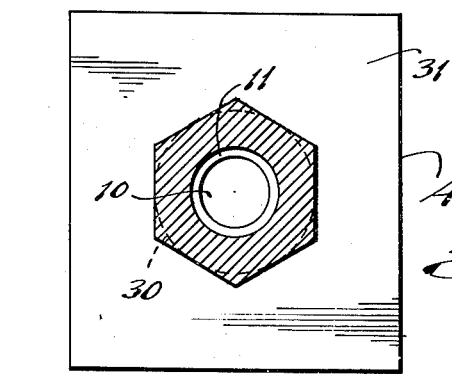
Fig. 2 is a face view of the upper die member taken approximately on line 2—2 of Fig. 1.
Figure 6:
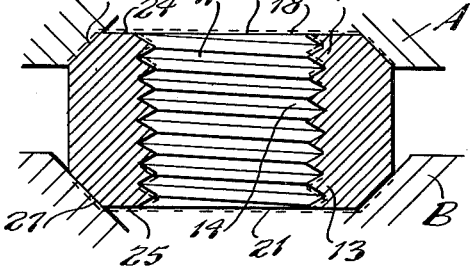
Fig. 6 is a similar view showing the threaded bore in full lines after the same has been acted upon by the die members, and in broken lines, the previous arrangement of the threaded bore.
Figure 3:
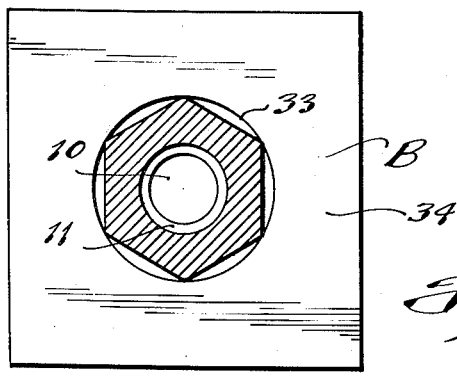
Fig. 3 is a face view of the lower die member taken approximately on line 3—3 of Fig. 1.
Figure 4:
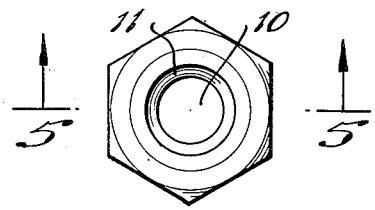
Fig. 4 is a view of one of the crown faces of the nut.

The die member A is formed with a recess 30 opening through the lower face 31 thereof and having an angular side wall 32 which coincides with the angular formation of the peripheral wall portion 26 of the crown face 18 of the nut. The die member B is also provided with a recess 33 which opens through the upper face 34 thereof and is disposed in alignment with the recess 30 in the die member A. The recess 33 in the die member B is formed with an angular wall 35 corresponding to the angular formation of the chamfered peripheral edge portion 27. The nut, as illustrated in Fig. 5 of the drawings, is adapted to be inserted between the die members A and B as shown in Fig. 2 of the drawings and by pressure applied to the upper die member A, the opposite crown portions of the nut are compressed axially inward so as to offset the opposite threaded portions 12 and 13 of the nut, as hereinbefore described.

The invention is also applicable to other types of nuts such as the nut 38 shown in position in the die members C and D in Fig. 10 of the drawings. This nut is provided with a crown face 39 and a flat face 40. The upper die member C is similar to the die member A while the lower die member D is provided with a recess 41 having a flat bottom wall 42 on which the nut 38 is positioned when the opposite ends thereof are compressed or compacted by pressure applied against the upper die member C. The nut 38 when compacted embodies the structural arrangement of the threaded bore as shown in Figs. 7, 8 and 9 of the drawings.

What is claimed is:

1. In a holding nut, a nut body having a threaded bore opening through the opposite ends thereof, said threaded bore having a plurality of convolutions of the thread at the opposite ends of the bore offset axially inward to substantially lessen but not exceed the tolerance of the nut whereby the nut will freely receive a stud at either end and will grippingly engage the stud when the same is in threaded engagement with the offset convolutions at both ends of the nut.

2. In a holding nut, a nut body having a threaded bore opening through the opposite ends thereof, said threaded bore on opposite sides of a central portion having end portions offset axially inward towards said central portion in an amount to substantially lessen but not exceed the tolerance of the nut.

EDWARD J. COLE.

REFERENCES CITED

The following references are of record in the file of this patent:

UNITED STATES PATENTS

| Number | Name | Date |
| --- | --- | --- |
| 1,367,168 | Stanford | Feb. 1, 1921 |

FOREIGN PATENTS

| Number | Country | Date |
| --- | --- | --- |
| 154,836 | Great Britain | Dec. 9, 1920 |